US009717994B1

(12) United States Patent
Lee et al.

(10) Patent No.: US 9,717,994 B1
(45) Date of Patent: Aug. 1, 2017

(54) INTEGRATED SCREEN BASEBALL PLATFORM AND METHOD FOR IMPLEMENTING THE SAME

(71) Applicant: Realyagu Zone Co., Ltd., Seoul (KR)

(72) Inventors: Seung Jin Lee, Seoul (KR); Han Jo Kwon, Seoul (KR); Hyoung Gon Kim, Seoul (KR)

(73) Assignee: REALYAGU ZONE CO., LTD., Seoul (KR)

( * ) Notice: Subject to any disclaimer, the term of this patent is extended or adjusted under 35 U.S.C. 154(b) by 0 days.

(21) Appl. No.: 15/408,240

(22) Filed: Jan. 17, 2017

(30) Foreign Application Priority Data

May 27, 2016 (KR) ........................ 10-2016-0065572

(51) Int. Cl.
| | |
|---|---|
| *A63F 9/24* | (2006.01) |
| *A63F 13/825* | (2014.01) |
| *A63F 13/537* | (2014.01) |
| *A63F 13/218* | (2014.01) |
| *A63F 13/31* | (2014.01) |

(Continued)

(52) U.S. Cl.
CPC ........ *A63F 13/825* (2014.09); *A63B 69/0013* (2013.01); *A63F 13/218* (2014.09); *A63F 13/31* (2014.09); *A63F 13/537* (2014.09); *A63F 13/65* (2014.09); *A63F 13/812* (2014.09); *A63F 13/828* (2014.09); *A63B 2069/401* (2013.01)

(58) Field of Classification Search
CPC .... A63F 13/812; A63F 13/573; A63F 13/798; A63F 13/213; A63F 13/245; A63F 13/25; A63F 13/35; A63B 2069/0008; A63B 69/0002; A63B 69/406; G06Q 10/0639; G09B 19/0038
See application file for complete search history.

(56) References Cited

U.S. PATENT DOCUMENTS

| | | | | |
|---|---|---|---|---|
| 5,885,156 A | * | 3/1999 | Toyohara | ................ A63F 13/10 463/1 |
| 2001/0006064 A1 | * | 7/2001 | Battersby | ............ A63B 69/406 124/78 |

(Continued)

FOREIGN PATENT DOCUMENTS

| | | |
|---|---|---|
| JP | 2001129257 A | 5/2001 |
| KR | 1020140112116 A | 9/2014 |
| KR | 101572526 B1 | 12/2015 |

OTHER PUBLICATIONS

"The fun of real baseball, as it is!! WindUp," Blog review, retrieved from URL=http://blog.naver.com/tifa1131/110083160335 on Mar. 24, 2010 (with English Translation), 6 pages.

*Primary Examiner* — Justin Myhr
(74) *Attorney, Agent, or Firm* — Seed Intellectual Property Law Group LLP

(57) ABSTRACT

Disclosed is an integrated screen baseball platform may include: a mobile character promotion game module that generates ability score information of a character, which has been promoted through a mobile character promotion game, by improving an ability score of the character; a PC management game module that generates management information of a baseball team by executing a PC management game through a user PC; and a screen baseball system that receives management the character ability score information and the management information of the baseball team and adjusts the level of difficulty of a screen baseball game by using any one thereof.

8 Claims, 9 Drawing Sheets

(51) Int. Cl.
*A63F 13/65* (2014.01)
*A63F 13/828* (2014.01)
*A63F 13/812* (2014.01)
*A63B 69/00* (2006.01)
*A63B 69/40* (2006.01)

(56) References Cited

U.S. PATENT DOCUMENTS

| | | | | |
|---|---|---|---|---|
| 2005/0130725 | A1* | 6/2005 | Creamer | A63F 13/10 463/1 |
| 2007/0091084 | A1* | 4/2007 | Ueshima | A63F 13/573 345/419 |
| 2008/0161113 | A1* | 7/2008 | Hansen | A63F 13/12 463/42 |
| 2008/0242425 | A1* | 10/2008 | Isaka | A63F 13/10 463/42 |
| 2012/0029666 | A1* | 2/2012 | Crowley | A63B 24/0062 700/91 |
| 2014/0135956 | A1* | 5/2014 | Thurman | A63B 69/002 700/91 |

* cited by examiner

INTEGRATED SCREEN BASEBALL PLATFORM AND METHOD FOR IMPLEMENTING THE SAME

BACKGROUND OF THE INVENTION

1. Field of the Invention

The present invention relates to an integrated screen baseball platform by which a user may enjoy a screen baseball game according to an ability score by applying information acquired from a mobile character promotion game and a PC management game to an offline screen baseball system such that the information may be associated with the screen baseball system and adjusting the level of difficulty and the balance of a game when the user performs a screen baseball game offline, and the user may enjoy the screen baseball game according to the taste of the user by selecting and applying a club according to the characteristics of the club, and a method for implementing the same.

2. Description of the Prior Art

In general, character promotion games provide services by which user may select and raise virtual characters, and include an online game, such as a roll play game, by which users may feel fun while raising characters, a dedicated game for promoting characters, and a game of a dedicated gaming device for promoting virtual characters.

Further, as the mobile technologies have recently developed, users who enjoy character promotion games in the form of mobile games also have gradually increased.

The online games or the character promotion dedicated games tend to excessively indulge the users in games to improve the external appearances of characters, fighting power, or various abilities on games, and may cause the users to neglect daily activities or exercises.

In the case in which the users promote virtual characters in dedicated gaming devices, they have to separately purchase the dedicated gaming devices and carry them and the games are monotonous.

In the case of mobile character promotion games, the user may enjoy character promotion games without using a separate dedicated gaming device, but the mobile character promotion games do not deviate from the form of the dedicated gaming devices, and repeats a monotonous game method and a limited growth pattern.

Accordingly, the mobile character promotion games lack factors that allow the users to continuously have interests and make the users readily feel bored.

Meanwhile, the databases of the PC management games may include business data, game schedule data, and player data.

The business data may include a team ID, the name of a club owner, the name of a home ground, club management costs, the name of a coach, and the name of a director.

Further, the game schedule data may relate to game schedules between a team managed by the user and a plurality of counterpart teams managed by the counterparts.

For example, a game schedule that says that the user team is scheduled to have matches with team A on Tuesday, Wednesday, and Thursday, and with team B on Friday, Saturday, and Sunday may be stored.

The player data include player ability data as well as a player ID, the number of a player, and a back number.

The player ability data may include data on a ball type, a change of a ball, a ball speed, and a ball control for a pitcher, and data on an ambidexterity, batting power, a base running speed, power, a batting eye, a reaction speed, the most confident course, and the least confident course for batter.

Further, the database may store player ability data of the user team and player ability data of a plurality of counterpart teams.

For example, the player ability data of team A that has matches with the user team on Tuesday, Wednesday, and Thursday and the player ability data of team B that has matches with the user team on Friday, Saturday, and Sunday are stored.

However, conventionally, most games aim to promote a character through a mobile promotion game, manage a player through a PC management game, or manage a club (team).

That is, only a character may be promoted through a mobile promotion game or only management of a club may be allowed through a PC management game, but there has been no mutually associated integrated platform that shows a new synergy effect by applying information acquired from a mobile promotion game and a PC management game to an offline screen baseball system.

Accordingly, the present inventors have devised an integrated screen baseball platform by which the level of difficulty of a game may be adjusted when the user performs a screen baseball game offline by applying information acquired from a mobile character promotion game and a PC management game to an offline screen baseball system such that the information is associated with the screen baseball system, and a method for implementing the same.

SUMMARY OF THE INVENTION

The present invention provides an integrated screen baseball platform by which a user may enjoy a screen baseball game according to an ability score by applying player index data generated through a mobile promotion game module and club index data generated through a PC management game module and adjusting the level of difficulty and the balance of a game when the user performs a screen baseball game offline, and the user may enjoy the screen baseball game according to the taste of the user by selecting and applying a club according to the characteristics of the club.

The present invention also provides a method for implementing an integrated screen baseball platform for achieving the object.

In order to achieve the objects, an integrated screen baseball platform may include: a mobile character promotion game module that generates ability score information of a character, which has been promoted through a mobile character promotion game, by improving an ability score of the character; a PC management game module that generates management information of a baseball team by executing a PC management game through a user PC; and a screen baseball system that receives management the character ability score information and the management information of the baseball team and adjusts the level of difficulty of a screen baseball game by using any one thereof.

In order to achieve the objects, the mobile character promotion game module may include: a mobile game DB in which score data of the mobile game executed by the mobile device of the user is stored and accumulated; a player index conversion unit that receives the accumulated score data, calculate the received score data, and generates score index data; and a player index DB in which the generated player index data is stored as the character ability score information.

In order to achieve the objects, the PC management game module may include: a club setting DB in which, when it is necessary to change setting of a club among the generated management information of the baseball team, the setting of the club is changed and the changed setting information of the club is stored; an online game DB in which, when it is unnecessary to change the setting of the club, scores for games, which have been progressed by an automatic match simulation and have been collected, are stored and accumulated; a club index conversion unit that receives the accumulated game score information and converts the received game score information to the club index data; and a club index DB in which the converted club index data is stored.

In order to achieve the objects, the screen baseball system may include: a player index game reflecting unit that receives the stored character ability score information and reflects the received character ability score information on the game; a club index game reflecting unit that receives the stored club index data and reflects the received club index data on the game; and a screen baseball DB that, when it is set such that the received player index data and the received club index data are used, stores screen baseball data generated during the progressed screen baseball game.

In order to achieve the objects, a method for implementing an integrated screen baseball platform may include: (a) generating ability score information of a character, which has been promoted through a mobile character promotion game, by improving an ability score of the character, by a mobile character promotion game module; (b) executing a PC management game through a user PC and generating management information of a baseball team, by a PC management game module; and (c) receiving management the character ability score information and the management information of the baseball team and adjusts the level of difficulty of a screen baseball game by using any one thereof, by a screen baseball system.

In order to achieve the objects, in the method for implementing an integrated screen baseball platform, (a) may further include: selecting a mobile game from a mobile device of a user, logging in the mobile game with a personal ID, and executing the selected mobile game; storing and accumulating the score data of the executed mobile character promotion game in a mobile game DB; receiving the accumulated score data, calculating the received score data, and generating the player index data, by a player index conversion unit in the mobile character promotion game module; and storing the generated player index data in a player index DB of a promotion game module as the character ability score information.

In order to achieve the objects, in the method for implementing an integrated screen baseball platform, (b) further may include: determining whether it is necessary to change setting of a club among the generated management information of the baseball team; when it is necessary to change setting of a club among the generated management information of the baseball team, changing and storing the setting of the club in a club setting DB; when it is unnecessary to change the setting of the club, progressing the game through an automatic match simulation; collecting scores of the progressed games and storing and accumulating the collected scores in an online game DB in the PC management game module as game score information; transmitting the accumulated game score information to a club index conversion unit in the PC management game module and converting the transmitted game score information to club index data; and storing the converted club index data in a club index DB in the PC management game module.

In order to achieve the objects, in the method for implementing an integrated screen baseball platform, (c) further may include: (c-1) transmitting the player index data to the player index game reflecting unit; (c-2) transmitting the club index data to the club index game reflecting unit; (c-3) determining whether dissimilar data of the transmitted player index data and the transmitted club index data are used; (c-4) progressing a game after adjusting a level of difficulty of the screen baseball game, according to the transmitted player index data and the transmitted club index data, by the screen baseball system; and (c-5) storing screen baseball data generated during the screen baseball game, in a screen baseball DB.

In order to achieve the objects, in the method for implementing an integrated screen baseball platform, (c-4) further may include: when the dissimilar data, of which use has been set, are both the player index data and the club index data, reflecting both the player index data and the club index data to adjust the level of difficulty of the screen baseball game; when the dissimilar data, of which use has been set, is only the player index data, reflecting only the player index data to adjust the level of difficulty of the screen baseball game; and when the dissimilar data, of which use has been set, is only the club index data, reflecting only the club index data to adjust the level of difficulty of the screen baseball game.

The setting information of the club may include an entry and trades of players.

The accumulated game score information may include a strategy success rate.

The strategy may include hit and run, run and hit, a defense shift, intentional base on balls, steal, buster, a courtesy runner, and a bunt.

The ability score information of the character may include a force, a base running speed, a striking speed, and a striking accuracy of the player.

The details of the other embodiments are included in "Detailed Description of the Invention" and the accompanying drawings.

The above and other aspects, features and advantages of the invention will become apparent from the following description of the following embodiments given in conjunction with the accompanying drawings.

However, the present invention is not limited to the embodiments disclosed below, but may be implemented in various forms. The embodiments of the present invention are provided to make the disclosure of the present invention complete and fully inform those skilled in the art to which the present invention pertains of the scope of the present invention.

According to the present invention, a new synergy effect may be obtained by applying information acquired from the mobile character promotion game and the PC management game to the offline screen baseball system such that the information is associated with the screen baseball system.

Further, because the level of difficulty and the balance of the screen baseball game is adjusted by reflecting ability score information of the character generated by the mobile character promotion game and management information generated by the PC management game when the user performs the screen baseball game offline, the user may enjoy the screen baseball game according to his or her ability score.

Further, the screen baseball game may be enjoyed according to the taste of the user by selecting and applying a club according to the characteristics of the club.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE EXEMPLARY EMBODIMENTS

Figure 1:
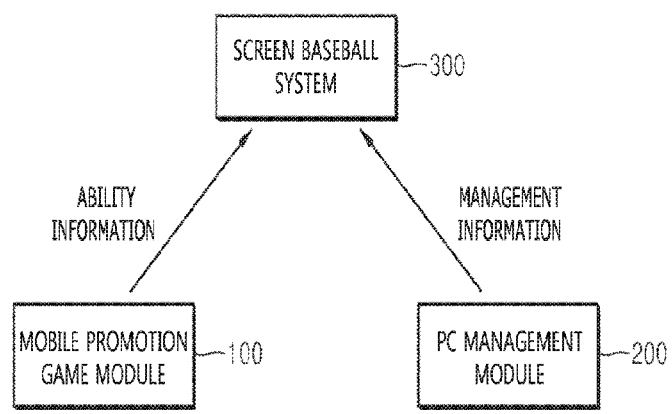
FIG. 1 is a block diagram of an integrated screen baseball platform according to the present invention.

Hereinafter, preferred embodiments of the present invention will be described in detail with reference to the accompanying drawings.

Prior to a detailed description of the present invention, it should be understood that the terms and wordings used herein should not be construed to be limited to general or lexical means and the concepts of the terms may be defined to describe the invention made by the inventor(s) of the present invention in the best way, and moreover the terms and wordings should be constructed to have meanings and concepts that agree with the technical spirit of the present invention.

That is, it should be understood that the terms used herein are used only to described preferred embodiments of the present invention, but are not used to limit the contents of the present invention, and the terms are defined in consideration of various possibilities of the present invention.

Further, in the specification, a similar expression may include a plural expression unless it is indicated clearly, and a plural expression may include a singular form similarly.

Throughout the specification, when it is described that an element includes another element, it may mean that the first element may further includes any other element without excluding the other element unless a particularly contradictory description is made.

Moreover, when it is described that any element is "present within or connected with" another element, the first element may be directly connected with the second element to contact the second element and may be spaced apart from each other, and when they are spaced apart from each other by a specific distance, a third element or unit for fixing or connecting the first element with the second element may be present and a description of the third element or unit may be omitted.

Meanwhile, when it is described that any element is "directly connected with" another element, it should be understood that a third element or unit is not present.

Similarly, it should be construed that other expressions that describe the relationships between elements, such as "between", "directly between", "adjacent to", and "directly adjacent to" may have the same purpose.

Further, it should be understood that in the specification, if terms, such as "one surface", "an opposite surface". "one side", "an opposite side", "first", and "second" are used, they are used to clearly distinguish one element form the other elements, the meaning of the corresponding element is not restricted by the terms.

Further, it should be understood that in the specification, the terms, such as "upper", "lower", "left", and "right", which related to the locations, are used, they indicate a relative location in the drawing, and should not be construed to mention an absolute location unless an absolute location is not particularly specified.

Moreover, it should be understood that in the specification of the present invention, if the terms such as "unit", "-er (-or)", "module", and "device" is used, they means a unit for processing at least one function or operation, and may be implemented through hardware, software, or a combination of hardware and software.

Further, in denotation of reference numerals for elements of the drawings, the same elements are denoted by the same reference numerals even though they are indicated in another drawing, that is, the same reference numerals denote the same elements throughout the specification.

In the accompanying drawings, the sizes, locations, coupling relationships of the elements may be partially exaggerated or reduced, or omitted to clearly deliver the spirit of the present invention or for convenience of description, and accordingly, the proportion or scale may not be strict.

Further, in the following description of the present invention, a detailed description of configurations that may make the essence of the present invention unnecessarily obscure, for example, known technology including the conventional technology may be omitted.

A mobile device that will be described below includes a smartphone, a personal digital assistant (PDA), a portable multimedia player (PMP), and a smart pad, which may perform a computer supported function, such as an internet communication.

FIG. 1 is a block diagram of an integrated screen baseball platform, and the integrated screen baseball platform includes a mobile character promotion game module 100, a PC management game module 200, and a screen baseball system 300.

Figure 2:
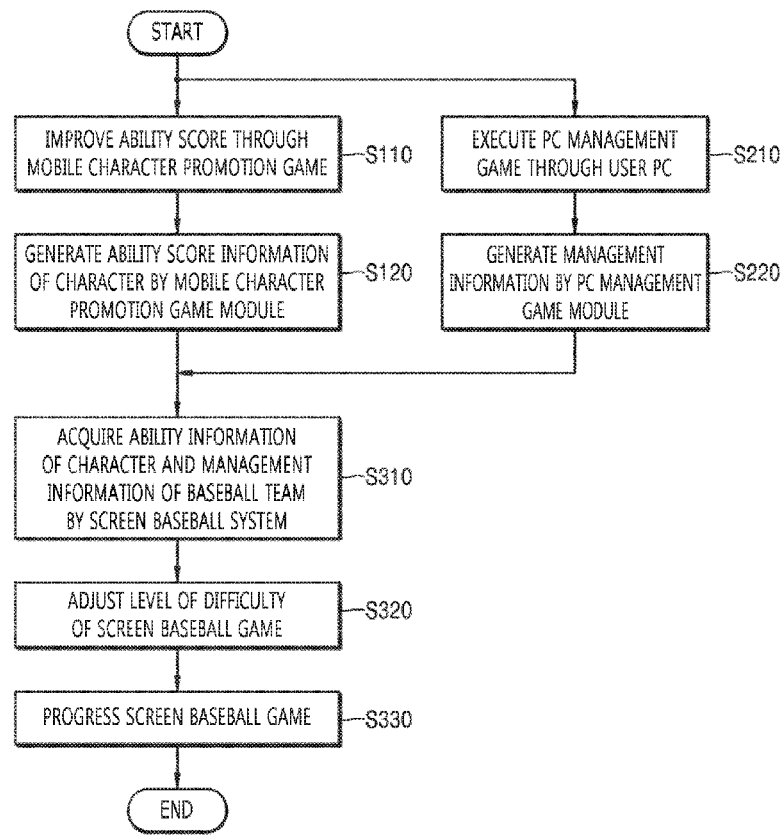
FIG. 2 is a flowchart illustrating operations of a method for implementing an integrated screen baseball platform according to the present invention.

FIG. 2 is a flowchart illustrating operations of a method for implementing an integrated screen baseball platform according to the present invention.

Functions of components of the integrated screen baseball platform according to the present invention will be described with reference to FIGS. 1 and 2.

The mobile character promotion game module 100 improves an ability score of a character if a user promotes the corresponding character through a character promotion game, and transmits ability score information of the character to the offline screen baseball system 300.

Then, the ability score of the character may include a force, a base running speed, a striking speed, and a striking accuracy.

The PC management game module 200 adjusts a lineup of a plurality of players who perform a game by using data stored in an online game database (DB), and allows the user to select and set a suitable club when the user desires to change settings of the club.

In more detail, the suitable club here relates to characteristic information of a club, and may include a club that possesses batting power, a club that has a high base stealing rate due to high base running speed, and a club that has a low earned run average and a high pitching strength.

The characteristic information of the club is applied to the screen baseball system 300.

The screen baseball system 300 receives ability score information of a character produced by a mobile character promotion game and also receives management information produced by a PC management game to allow a user to perform a screen baseball game according to his or her ability score by adjusting a level of difficulty or a balance of the screen baseball game by using at least one of them.

Further, the screen baseball system 300 allows a user to perform a screen baseball game according to his or her taste by selecting and applying a club according to the characteristic information of the club.

<Operations of Mobile Character Promotion Game Module 100>

Figure 3:
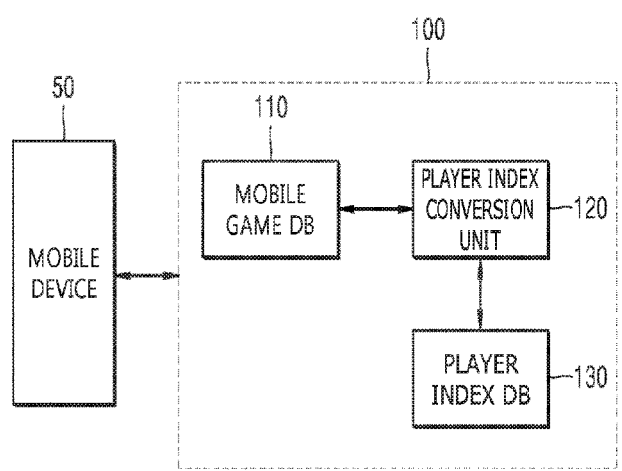
FIG. 3 is a block diagram of a mobile character promotion game module 100 in the integrated screen baseball platform according to the present invention.

FIG. 3 is a block diagram of a mobile character promotion game module 100 in the integrated screen baseball platform according to the present invention. The mobile character promotion game module 100 includes a mobile game DB 110, a player index conversion unit 120, a player index DB 130.

Figure 4:
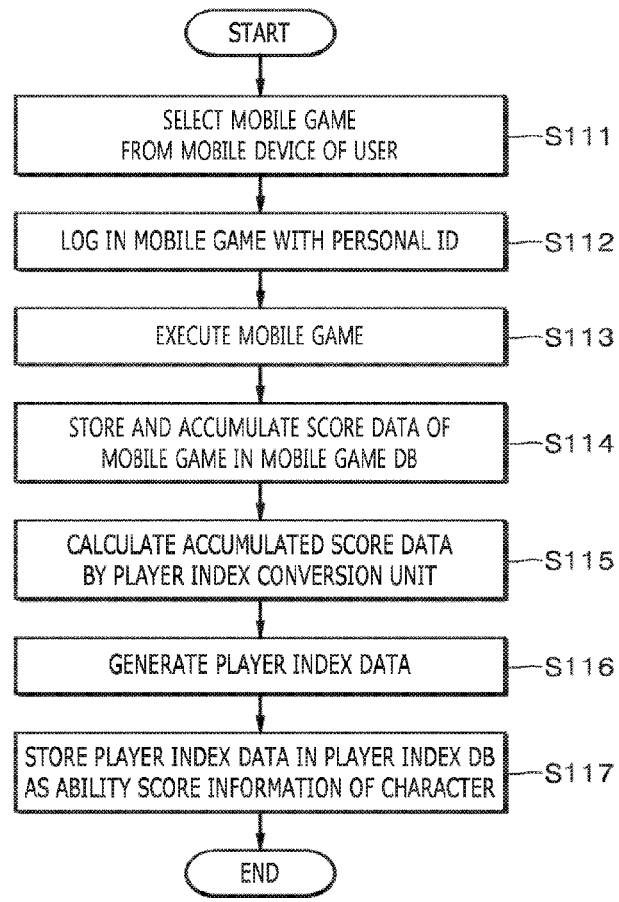
FIG. 4 is a flowchart illustrating operations of the mobile character promotion game module 100 in the integrated screen baseball platform according to the present invention.

FIG. 4 is a flowchart illustrating operations of the mobile character promotion game module 100 in the integrated screen baseball platform according to the present invention.

The operations of the mobile character promotion game module 100 in the integrated screen baseball platform according to the present invention will be described with reference to FIGS. 1 to 4.

First, it will be assumed that a user subscribed to a homepage of an integrated screen baseball platform server according to the present invention by using a mobile device 50.

The mobile character promotion game module 100 generates player index data through the following process.

That is, if the user selects a mobile game from the mobile device 50 (S111), logs in the mobile game with a personal ID (S112), and executes the mobile game (S113), score data of the user for the corresponding mobile game may be stored and accumulated in the mobile game DB 110 (S114).

Then, the score data of the user may be data that is provided by a game (a game for a force, a base running speed, a striking speed, and a striking accuracy) by which a force, a base running speed, a striking speed, a striking accuracy, and the like, which are ability scores of a character, may be improved.

Further, the score data may be converted into one or more of a force, a base running speed, a striking speed, and a striking accuracy to be applied in an integrated game as well as individual games (games for a force, a base running speed, a striking speed, and a striking accuracy).

Moreover, the above-described mobile game may be an Olympic game that is general in relation to an ability score of the character.

For example, among items of Olympic game, an ability score of a character may be improved by executing a weight lifting game associated with a force and converting data acquired through the weight lifting game to a force and an ability score of a character may be improved by executing a track and field game associated with a running race and converting data acquired through the track and field game to a base running speed, and a striking accuracy may be improved through an archery game or a shooting game according to the method.

Because the mobile game is performed through a very simple manipulation (for example, in a manner in which a speed is increased by pushing a left button repeatedly in a track and field game), the user may easily contact the game and does not feel dull so that the user may be easily guided to the mobile game.

The player index conversion unit 120 receives the accumulated score data from the mobile game DB 110 to perform a calculation (S115) and generates player index data (S116), and the generated player index data is stored in the player index DB 130 as character ability score information (S117).

In general, the character promotion game device includes hardware and software for a character promotion game therein.

For example, the character promotion game device includes a promotion unit that functions as a game processing unit, and a transmission/reception control unit that controls reception and transmission of data from the Internet.

The user allows the mobile device 50 to access the server through a network center and allows the mobile device 50 to receive character promotion game image information and various other image information elements as game data, and the image is displayed on a monitor of the mobile device 50.

Then, the image information includes at least one of image data and text data.

The game is executed in a manner in which the user responds to an instruction during an image display on the monitor. The response data is transmitted as game data to the game device, and a promotion of a specific character is processed as processing of the game according to the data.

A promotion result on various abilities is finally determined by repeating the transmission/reception and processing of a promotion a specific number of times.

Then, the promotion result is notified through the mobile device 50 of the user after a specific time period elapses. Meanwhile, the user runs a player, who has been promoted by the user, by using a promotion mode, and executes a baseball game application in which the player is brought face to face with a team of the computer.

For example, an implementation of a promotion mode of a baseball player by the mobile device 50 and a baseball game mode will be described.

If the user selects a promotion mode from a selection menu displayed on the screen of the mobile device 50, a registration screen of a rookie is displayed, and the name and the attribute of the player, whether the player is a pitcher or a hitter, the type of the pitcher, and a desired promotion type (in the case of a hitter, for example, a cleanup hitter and the like) are registered.

Various ability scores are initially set to the player, and the user is guided to be promoted as a unique player desired by the user through the following operations.

If the registration is finished, an actual promotion process starts, and progresses in unit of one week, for example, with an instruction of one action (various exercises or rests) for 3 years, in a time zone of the game space.

With regard to the instruction contents, a score may be obtained (or subtracted) with a specific probability, and if the instruction is repeated for 3 years and finally a specific promotion condition is cleared, the promotion succeeds so that the player is promoted to Major League team, that is, is registered in a baseball game mode to be run in the baseball game.

The baseball game mode includes a one-player game mode and a two-player game mode, and for example, when a one-player game mode is selected, a computer team and a user team consisting of players who have promoted to Major League by the user are brought face to face with each other.

A stadium, a player character, and the like are displayed on the screen of the monitor, and it is programmed such that the game progresses according to the rules of a baseball except for the character that is operated directly through an operation instruction of the user. Then, the game program may be configured such that the user may add or subtract all of a character that is operated directly through an instruction of the user and other motions (striking, base running, pitching, and defending) of the character, based on various ability scores, to give a unique difference.

To the user character in the screen of the monitor, which is manipulated by using various keys and buttons of the game controller, a striking instruction or a base running instruction is made during an attack, a pitcher character is manipulated before pitching and a manipulation target is moved to a fielder located in a direction to which a ball flies after pitching, during a defense, and an operation of the fielder are instructed, so that the ball may be caught and returned. Further, when the ninth inning is finished, a team having the higher score becomes a winner.

The promotion contents of the game that promotes a baseball player may have striking power, base running, and defending for various abilities of a fielder and a shoulder force and a breaking ball for various abilities of a pitcher, in addition to various abilities, such as a muscular force, an agility, and a technique, as basic abilities required in the baseball game.

Further, the promotion result types may be classified into a plurality of types are prepared.

An example of the promotion result type, for example, includes a striking force, a player having a high hitting ability, a player having a high defending ability, and a player having a high running ability, as a fielder.

An example of the promotion result type includes a fast-ball pitcher, a breaking ball pitcher, a relief-specific pitcher, a pitcher who is strong to a specific pitcher (for example, a left-handed batter), as a pitcher.

<Operations of PC Management Game Module 200>

Figure 5:
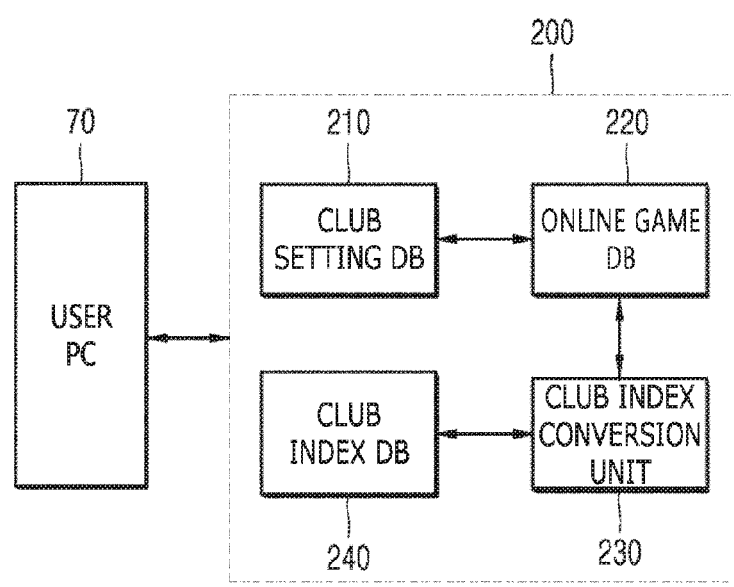
FIG. 5 is a block diagram of a PC management game module 200 in the integrated screen baseball platform according to the present invention.

FIG. 5 is a block diagram of a PC management game module 200 in the integrated screen baseball platform according to the present invention. The PC management game module 200 includes a club setting DB 210, an online game DB 220, a club index conversion unit 230, and a club index DB 240.

Figure 6:
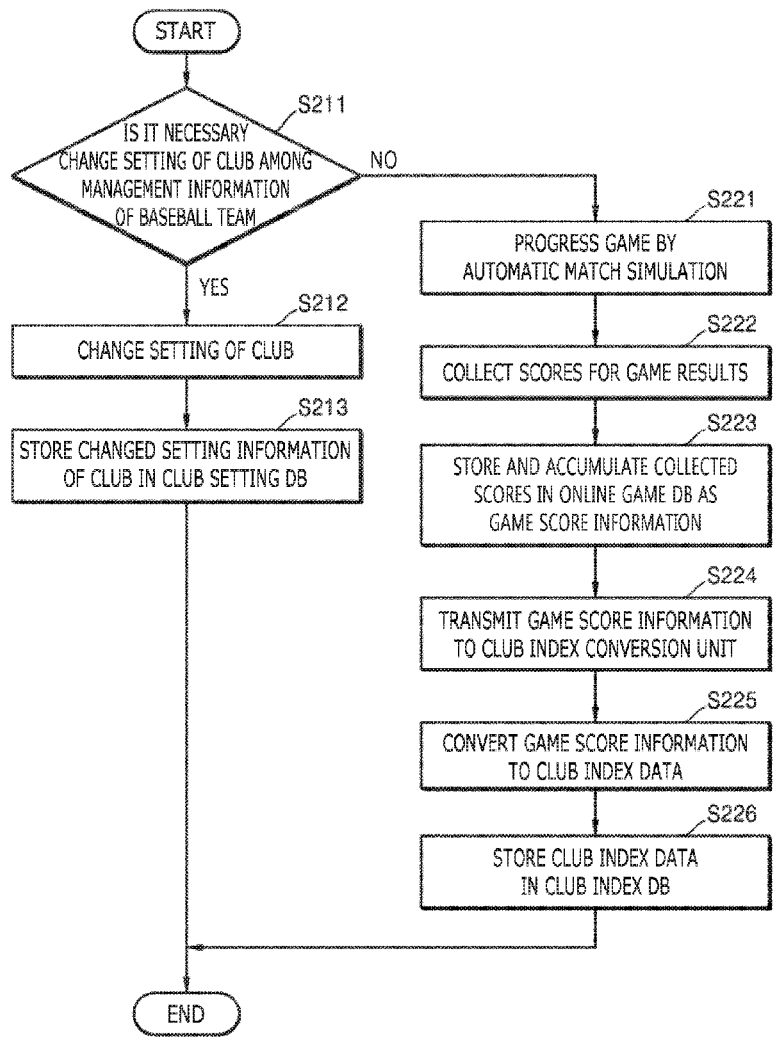
FIG. 6 is a flowchart illustrating operations of the PC management game module 200 in the integrated screen baseball platform according to the present invention.

FIG. 6 is a flowchart illustrating operations of the PC management game module 200 in the integrated screen baseball platform according to the present invention.

The operations of the PC management game module 200 in the integrated screen baseball platform according to the present invention will be described with reference to FIGS. 1 to 6.

The PC management game module 200 generates player index data through the following process.

That is, the PC management game module 200 may generate management information of a baseball team by executing a PC management game through a user PC 70.

The PC management game of the present invention is a PC game for managing a baseball team, and the management information of a baseball team includes management information on a search for emerging talents, trades of players, participation for games.

The PC management game module 200 may calculate a plurality of relative ability scores by comparing an average value of player ability data of a user team with an average value of player ability data of a counterpart team.

For example, an average value that is obtained by averaging player ability data (for example, a batting eye, a reaction speed, power, batting power, and an ambidexterity) of batters (fielders) of a user team may be compared with an average value that is obtained by averaging player ability data (for example, a pitch, a change of a ball, a ball speed, and a control of a ball) of a pitcher of a counterpart team.

In a PC management game, the user adjusts a lineup of players who have to manage a plurality of games.

For example, a batting order of batters may be adjusted, some of Minor League baseball players may be moved to Major League, or a bench warmer may become a regular player.

Further, a starting pitcher and a closing pitcher may be exchanged, or a starting rotation order may be changed.

When the user adjusts the lineup, he or she may adjust an optimum lineup while referring a relative ability score with a plurality of counterpart teams that is to confront the user's team in a specific time period.

For example, the user team may be adjusted to have a relatively uniform high ability score against a plurality of counterpart teams, or may be adjusted to have a relatively high ability score only against a specific counterpart team.

Meanwhile, it is determined whether it is necessary to change setting of a club, among management information generated by the PC management game module 200 (S211).

When the user changes the setting of the club, a suitable club is selected from a plurality of candidate clubs and is set (S212).

Then, the club setting information may include an entry and trade of players, and when the setting of the club is changed, the changed club information is stored in the club setting DB 210 (S213) and then is transmitted to the club index game reflecting unit of the screen baseball system 300.

If it is not necessary to change the setting of the club, games are progressed by an automatic match simulation (S221), scores of the progressed games are collected (S222), and are stored and accumulated in the online game DB 220 as game score information (S223).

Then, the accumulated game score information may be a strategy success rate, and a strategy may include hit and run, run and hit, a defense shift, intentional base on balls, steal, buster, a courtesy runner, and a hunt (a sacrifice bunt, a sudden but, a squeeze bunt).

The accumulated game score information is transmitted to the club index conversion unit 230 (S224) and is converted to club index data (S225), and the converted club index data is stored in the club index DB 240 (S226).

<Screen Baseball Game Method in Screen Baseball System 300>

Figure 7:
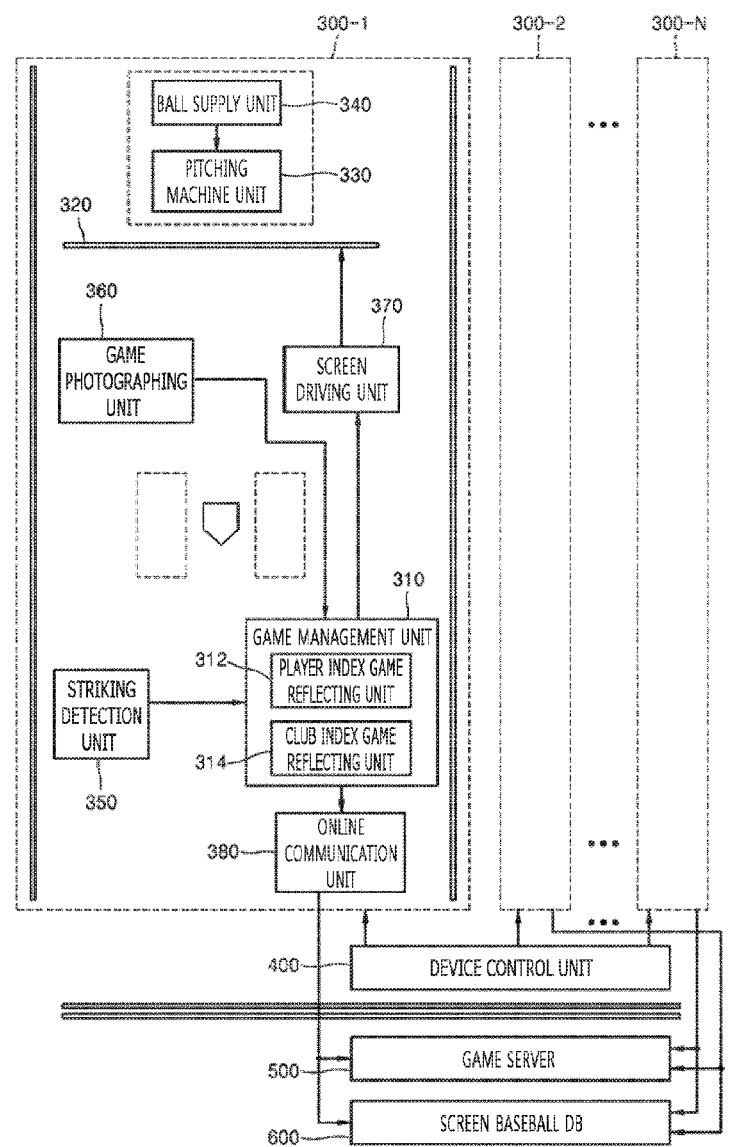
FIG. 7 is a block diagram of a screen baseball system 300 in the integrated screen baseball platform according to the present invention.

FIG. 7 is a block diagram of a screen baseball system 300 in the integrated screen baseball platform according to the present invention. The screen baseball system 300 includes a plurality of screen baseball devices 300-1 to 300-N, a device control unit 400, a game server 500, and a screen baseball DB 600.

Each of the plurality of screen baseball devices 300-1 to 300-N includes a game management unit 310, a screen 320, a pitching machine unit 330, a ball supply unit 340, a striking detecting unit 350, a game photographing unit 360, a screen driving unit 370, and an online communication unit 380.

The game management unit 310 includes a player index game reflecting unit and a club index game reflecting unit 314.

The operations of the screen baseball system 300 in the integrated screen baseball platform according to the present invention will be described with reference to FIGS. 1 to 7.

The game management unit 310 registers a personal rank of the user, receives striking detection data and performs a simulation along the converted locus of a ball, displays an image of the game on the screen 320 through the screen driving unit 370, and variously adjusts the shape of the pitcher according to a distance between the screen 320 and a batter's box.

The player index game reflecting unit 312 in the game management unit 310 receives character ability score information stored in the player index DB 130 in the mobile character promotion game module 100 (S311).

The club index game reflecting unit 314 in the game management unit 310 receives club index data stored in the club index DB 240 in the PC management game module 200 (S312).

It is determined whether both dissimilar data of the transmitted player index data and the transmitted club index data are used (S313).

If it is set such that both the dissimilar data are used, the level of difficulty and the balance of the baseball game are adjusted by reflecting both the player index data and the club index data (S314).

When it is set such that only the player index data of the dissimilar data is used (S321), only the player index data is reflected (S322), and when it is set such that only the club index data is used (S331), the level of difficulty and the balance of the screen baseball game is adjusted by reflecting only the club index data (S332).

The screen baseball game is progressed after the level of difficulty of the screen baseball game is adjusted through the process (S341), and the screen baseball data generated during the screen baseball game is stored in the screen baseball DB (S342).

Meanwhile, the pitching machine unit 330 receives a ball from the ball supply unit 340 and automatically or manually shoots the ball according to information of a pitch ball, of which a pitch has been selected by a defense side of the user.

The striking detecting unit 350 includes a plurality of front detection sensors, a plurality of planar location sensors, and a camera sensor, and detects coordinate data of a ball, a non-stricken strike ball, and a foul ball, removes a shaded portion of the locus of the ball, and detects a change in the ball movement direction at a striking point.

The game photographing unit 360 captures a striking image of the user and transmits the captured image to the game management unit 310.

The screen driving unit 370 receives a striking image captured by the game photographing unit 360 and a simulation image of the game management unit 310 and realizes the simulation image on the screen 320.

The online communication unit 380 transmits the simulation information display on the screen 320 and striking image data to the game server 500 and the screen baseball DB 600.

The device control unit 400 monitors and controls the plurality of screen baseball devices 300-1 to 300-N provided in the store in an integrated manner.

The game server 500 receives the displayed simulation information and the striking image data to another user in an area geographically spaced apart from the user in real time to progress the game online.

When the player index data that received from the mobile character promotion game module 100 and the club index data received from the PC management game module 200 are set to be used, the screen baseball DB 600 stores the screen baseball data generated during the screen baseball game.

Further, the striking image and the game information data are received from the online communication unit 380 and are stored to be utilized in a user promotion program and a character promotion program.

Figure 8:
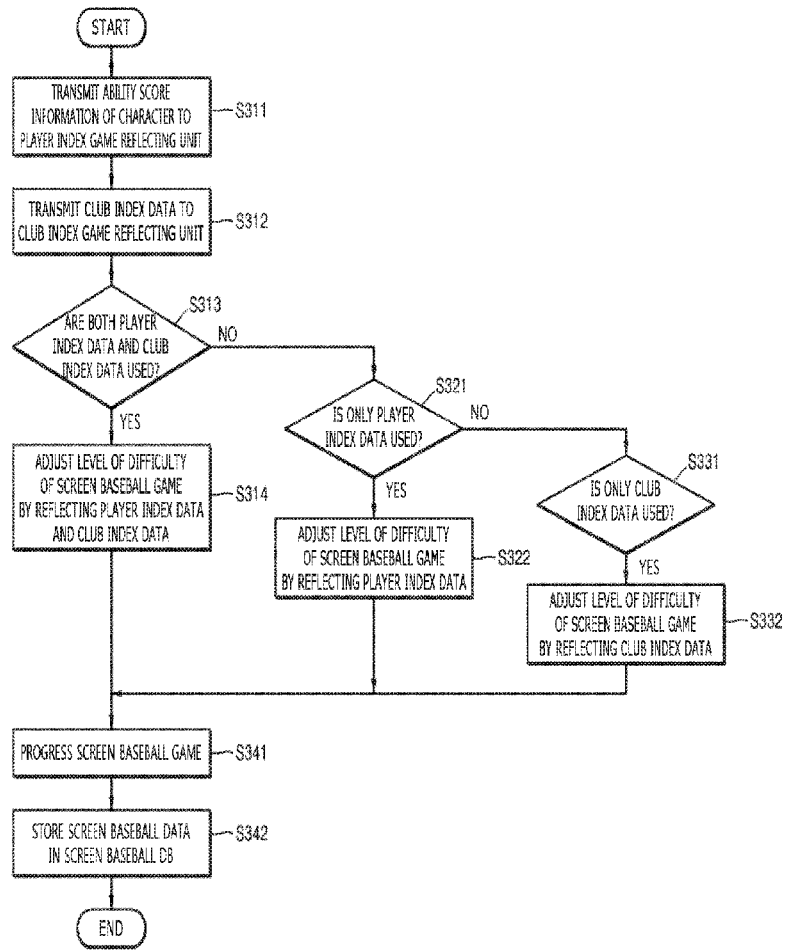
FIG. 8 is a flowchart of operations of the screen baseball system 300 in the integrated screen baseball platform according to the present invention.

FIG. 8 is a flowchart of operations of the screen baseball system 300 in the integrated screen baseball platform according to the present invention.

Figure 9:
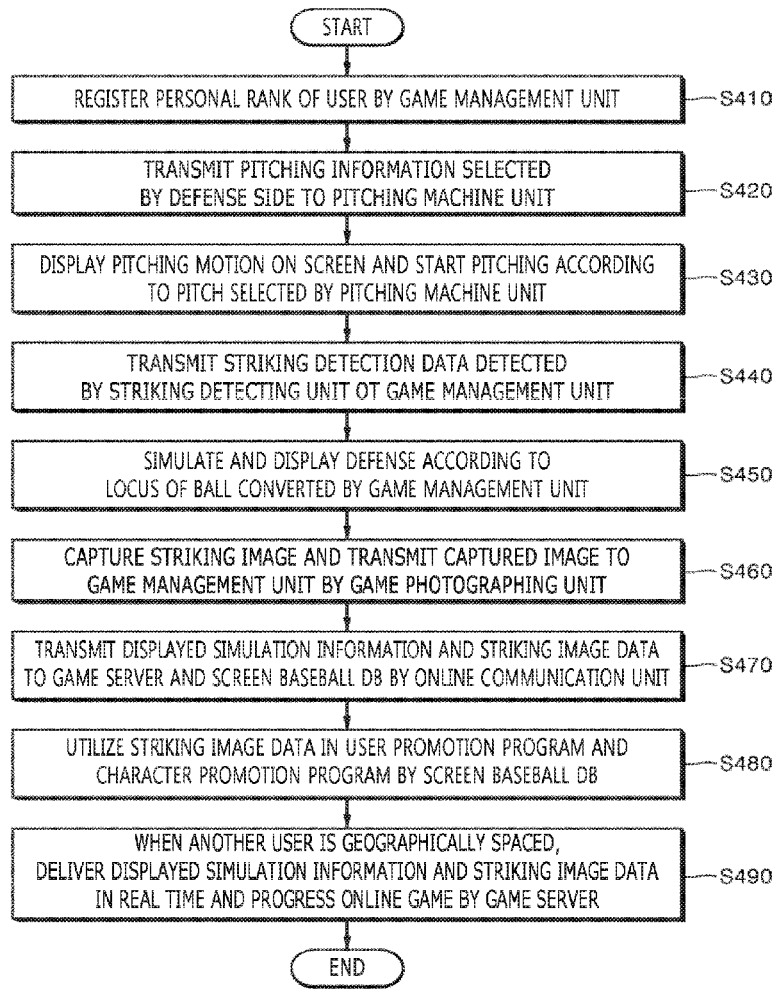
FIG. 9 is a flowchart of operations of a method of playing a game by using the screen baseball system 300 in the integrated screen baseball platform according to the present invention.

FIG. 9 is a flowchart of operations of a method of playing a game by using the screen baseball system 300 in the integrated screen baseball platform according to the present invention.

The operations of the screen baseball system 300 in the integrated screen baseball platform and the method for playing a game by using the screen baseball system 300 according to the present invention will be described with reference to FIGS. 1 to 9.

It may be set such that the screen baseball system 300 uses dissimilar data.

Then, the dissimilar data refer to player index data that is ability score information of a character generated by the mobile character promotion game module 100 and club index data that is management information of a baseball team generated by the PC management game module 200.

Then, the operations of the mobile character promotion game module 100 and the PC management game module 200 may be sequentially progressed, or may be progressed at the same time if necessary.

Accordingly, if it is set such that the dissimilar data are used, the user enjoys the screen baseball game in the screen baseball system 300, and the screen baseball data generated during the game is stored in the screen baseball DB.

First, the game management unit 310 registers a personal rank of the user and opens a game (S410).

If the batter enters the batter's box, the game management unit 310 identifies a personal rank of the corresponding batter from the registered user information.

That is, the player index game reflecting unit 312 in the game management unit 310 receives character ability score information that is player index data generated by the mobile character promotion game module 100.

Meanwhile, the club index game reflecting unit 314 in the game management unit 310 receives club index data stored in the club index DB 240 in the PC management game module 200, and reflects the received club index data on the game.

If the defense side of the user takes a basic defense motion, for example, of selecting a pitch of a ball, information on the pitch of the ball is sent to the pitching machine unit 330 (S420).

If the batter pushes a pitching pedal placed in the batter's box, a pitching motion is displayed on the screen 320 and the pitching is started according to the selected pitch (S430).

If the batter strikes a ball, the striking information is delivered from the striking detecting unit 350 to the game management unit 310 (S440), the corresponding striking information is analyzed as a locus of an arch, a game simulation is performed based on the corresponding analysis, and an image of the game is displayed on the screen 320 (S450).

Then, the game photographing unit 360 installed at an upper portion of the left or right wall surface on the front side of the batter captures a striking image of the user and transmits the captured image to the game management unit 310 (S460).

The same process is performed on the next batter, and the game is continuously progressed according to a baseball game rule.

The contents of the game are sent to the game server 500 and the screen baseball DB 600 through the online communication unit 380 (S470).

Further, the screen baseball DB 600 receives the striking image and the game information data from the game management unit 310 and stores the received striking image and the received game information data, and utilized the stored striking image and the stored game information data in the user promotion program and the character promotion program (S480).

Meanwhile, when a counterpart of the game is another user in an area that is geographically spaced apart from the user, the game server 500 may deliver the displayed simulation information and the displayed striking image data to a store in which the counterpart is located to progress the game online in real time (S490).

For example, when a plurality of users desire to form one team in a store C and play a match game with another team but the desired counterpart team is located in another store D, the game server 500 may display simulation information and striking image data displayed in the store C on a monitor or a screen of a game management unit of the store D, thereby achieving an effect of the user feeling as though both teams played a game in one place.

In this way, in the integrated screen baseball platform and the method for implementing the same according to the present invention, the level of difficulty and the balance of the game may be adjusted when the user performs a screen baseball game offline, by applying the player index data generated through the mobile promotion game module and the club index data generated through the PC management game module to the screen baseball system.

Through this, a new synergy effect may be obtained by applying information acquired from the mobile character promotion game and the PC management game to the offline screen baseball system such that the information is associated with the screen baseball system.

Further, because the level of difficulty and the balance of the screen baseball game is adjusted by reflecting ability score information of the character generated by the mobile character promotion game and management information generated by the PC management game when the user performs the screen baseball game offline, the user may enjoy the screen baseball game according to his or her ability score.

Further, the screen baseball game may be enjoyed according to the taste of the user by selecting and applying a club according to the characteristics of the club.

Although the preferred embodiments of the present invention have been described as examples, the description of the various embodiments described in "Detailed Description of the Invention" is exemplary, and those skilled in the art to which the present invention pertains may easily understand that the present invention may be variously modified or the equivalents thereof may be carried out.

Further, the present invention is not limited to the description because it may be implemented in various other forms, and the above description is provided to fully inform those skilled in the art to which the present invention pertains of the scope of the present invention to fully deliver the disclosed contents of the present invention, and it is noted that the present invention is defined only by the attached claims.

What is claimed is:

1. An integrated screen baseball platform comprising:
a screen baseball system that comprises a game management unit that comprises a player index game reflecting unit and a club index game reflecting unit, a screen that displays an image of a baseball game, a pitching machine unit that shoots a ball at the same time when the image is displayed on the screen, and a striking detecting unit that, if the ball shot by the pitching machine is stricken, detects the stricken ball, wherein a screen baseball game progresses according to a baseball rule by using club information comprising a plurality of player elements;
a mobile character promotion game module by which a mobile character promotion game progresses in a portable mobile device, wherein player index data, which is character ability score information, is generated by improving an ability score of a character that is promoted through a mobile character promotion game; and
a PC management game module that executes a PC management game through a user PC and generates club index data that is management information of a baseball team,
wherein the screen baseball system:
receives the player index data from the mobile character promotion game module and changes player information of the screen baseball game, by the player index game reflecting unit; and
receives the club index data from the PC management game module and changes club information of the screen baseball game, by the club index game reflecting unit,
wherein the screen baseball game is progressed by operating the pitching machine unit and the striking detecting unit, according to the baseball game rule, based on data on which the changed player information and the changed club information are reflected,
wherein the player information comprises at least one of information elements that are obtained by digitizing a force, a base running speed, a striking speed, and a striking accuracy of the player, and the club information comprises at least one of information elements that are obtained by digitizing batting power, a base running speed, and a pitching strength of the club,
wherein the screen baseball system, the portable mobile device, and the user PC are spaced apart from each other, and
wherein the PC management game module selects, changes, and sets a club desired by the user.

2. The integrated screen baseball platform of claim 1, wherein the mobile character promotion game module comprises:
a mobile game DB in which score data of the mobile character promotion game executed by the portable mobile device is stored and accumulated;
a player index conversion unit that receives the accumulated score data, calculate the received score data, and generates score index data; and a player index DB in which the generated player index data is stored.

3. The integrated screen baseball platform of claim 2, wherein the PC management game module comprises:
- a club setting DB in which setting information of a club is stored;
- an online game DB in which scores for games, which have been progressed by an automatic match simulation and have been collected, are stored and accumulated;
- a club index conversion unit that receives the accumulated game score information and converts the received game score information to the club index data; and
- a club index DB in which the converted club index data is stored.

4. The integrated screen baseball platform of claim 3, wherein the screen baseball system comprises a screen baseball DB in which screen baseball data generated during the screen baseball game is stored.

5. An integrated screen baseball implementing method using the integrated screen baseball platform of claim 1, the method comprising:
  (a) improving an ability score of a character that has been promoted through a mobile character promotion game progressed by the portable mobile device to generate player index data that is character ability score information, by the mobile character promotion game module;
  (b) executing a PC management game through the user PC to generate player index data that is management information of a baseball team, by the PC management game module; and
  (c) receiving the player index data and the club index data to adjust a level of difficulty of the screen baseball game, by the screen baseball system.

6. The integrated screen baseball implementing method of claim 5, wherein (a) further comprises:
  selecting a mobile character promotion game, logging in the mobile character promotion game with a personal ID, and executing the selected mobile character promotion game, by the portable mobile device;
  storing and accumulating the score data of the executed mobile character promotion game in a mobile game DB;
  receiving the accumulated score data, calculating the received score data, and generating the player index data, by a player index conversion unit in the mobile character promotion game module; and
  storing the generated player index data.

7. The integrated screen baseball implementing method of claim 6, wherein (b) further comprises:
  storing setting information of a club in a club setting DB;
  progressing games by an automatic match simulation;
  collecting scores of the progressed games and storing and accumulating the collected scores in an online game DB in the PC management game module as game score information;
  transmitting the accumulated game score information to a club index conversion unit in the PC management game module and converting the transmitted game score information to club index data; and
  storing the converted club index data in a club index DB in the PC management game module.

8. The integrated screen baseball implementing method of claim 7, wherein (c) further comprises:
  (c-1) transmitting the player index data to the player index game reflecting unit;
  (c-2) transmitting the club index data to the club index game reflecting unit;
  (c-3) progressing a game after adjusting a level of difficulty of the screen baseball game, according to the transmitted player index data and the transmitted club index data, by the screen baseball system; and
  (c-4) storing screen baseball data generated during the screen baseball game, in a screen baseball DB.

* * * * *